(12) United States Patent
Yang et al.

(10) Patent No.: US 12,218,494 B2
(45) Date of Patent: Feb. 4, 2025

(54) ELECTRICAL SHIELDING TERMINATION SYSTEMS

(71) Applicant: Hamilton Sundstrand Corporation, Charlotte, NC (US)

(72) Inventors: Nhia Yang, Roscoe, IL (US); Francis C. Belisle, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 294 days.

(21) Appl. No.: 17/716,562

(22) Filed: Apr. 8, 2022

(65) Prior Publication Data
US 2023/0327422 A1 Oct. 12, 2023

(51) Int. Cl.
| | |
|---|---|
| H02G 15/06 | (2006.01) |
| B64D 41/00 | (2006.01) |
| H01B 9/02 | (2006.01) |
| H01R 4/28 | (2006.01) |
| H01R 4/64 | (2006.01) |
| H02G 3/06 | (2006.01) |
| H02G 15/105 | (2006.01) |

(52) U.S. Cl.
CPC ............. *H02G 15/06* (2013.01); *B64D 41/00* (2013.01); *H01B 9/02* (2013.01)

(58) Field of Classification Search
CPC .... H02G 15/06; H02G 15/105; H02G 3/0666; H01B 9/02; H01R 4/28; H01R 4/646; B64D 41/00
See application file for complete search history.

(56) References Cited

U.S. PATENT DOCUMENTS

| | | | | |
|---|---|---|---|---|
| 4,135,776 A * | 1/1979 | Ailawadhi | ........... | H01R 9/0521 |
| | | | | 439/585 |
| 4,408,822 A * | 10/1983 | Nikitas | ................ | H01R 9/0521 |
| | | | | 439/583 |
| 4,963,104 A | 10/1990 | Dickie | | |
| 6,439,929 B1 | 8/2002 | Jenets | | |
| 7,485,806 B1 * | 2/2009 | Gretz | .................. | H02G 3/0666 |
| | | | | 174/553 |
| 7,687,714 B2 | 3/2010 | Deterre et al. | | |
| 9,434,328 B2 | 9/2016 | Oka et al. | | |

(Continued)

OTHER PUBLICATIONS

Extended European Search Report issued by Examiner Bertrand Hugueny, of the European Patent Office, dated Aug. 29, 2023, in corresponding European Patent Application No. 23165119.1.

*Primary Examiner* — Hoa C Nguyen
*Assistant Examiner* — Amol H Patel

(57) ABSTRACT

A conductor shielding termination assembly can include a housing tube defining an inner diameter housing channel therethrough. The housing tube can be made of conductive material. The assembly can include a shoulder bushing configured to insert within the inner diameter housing channel of the housing tube. The shoulder bushing can define an inner diameter bushing channel sized to receive an unshielded portion of a conductor. The assembly can include a clamping assembly configured to clamp around the housing tube and/or the conductor to axially lock the housing tube and the conductor and to trap a shielding termination between the housing tube and the clamping assembly. The clamping assembly can form a clamping inner diameter channel sized to receive a shielded portion of the conductor.

20 Claims, 12 Drawing Sheets

(56) References Cited

U.S. PATENT DOCUMENTS

| | | | |
|---|---|---|---|
| 2008/0003873 A1* | 1/2008 | Henningsen | H01R 24/40 |
| | | | 439/578 |
| 2012/0037419 A1* | 2/2012 | Mech | H02G 15/06 |
| | | | 174/74 A |
| 2021/0021074 A1* | 1/2021 | Fuchs | H01R 43/20 |
| 2021/0167563 A1* | 6/2021 | Clausen | H01R 4/183 |

* cited by examiner

ELECTRICAL SHIELDING TERMINATION SYSTEMS

FIELD

This disclosure relates to electrical shielding termination systems.

BACKGROUND

The standard applications for shielding of harnesses is shielding of a multi conductor bundle (harness) level for lightning threat level protection or for electromagnetic interference (EMI). The applications of high amperage power feeders, e.g., for high power electrical motors, is shielding for individual phases of feeder power. Shielding of large gauge power feeders is commonly not done due to vehicle weight impact, and then when shielding is done at the harness bundle level, the bundle bend radius is too large to facilitate installation. Thus, there is a difficulty in installation.

For the shielding to be effective for EMI performance, it needs to be a complete circumference connection with shield metal electrically connected to an electrically conductive housing around the feeder conductor. Shielding terminations to a housing or connectors is typically done with internal cone clamping geometry (which can be repairable) or with band clamps (which if crimped types are not repairable).

Such conventional methods and systems have generally been considered satisfactory for their intended purpose. However, there is still a need in the art for improved electrical shielding termination systems. The present disclosure provides a solution for this need.

SUMMARY

A conductor shielding termination assembly can include a housing tube defining an inner diameter housing channel therethrough. The housing tube can be made of conductive material. The assembly can include a shoulder bushing configured to insert within the inner diameter housing channel of the housing tube. The shoulder bushing can define an inner diameter bushing channel sized to receive an unshielded portion of a conductor. The assembly can include a clamping assembly configured to clamp around the housing tube and/or the conductor to axially lock the housing tube and the conductor and to trap a shielding termination between the housing tube and the clamping assembly. The clamping assembly can form a clamping inner diameter channel sized to receive a shielded portion of the conductor.

In certain embodiments, the clamping assembly includes two or more clamp pieces configured to assemble around and to compress against the shielded portion of the conductor.

The housing tube can include one or more housing lock features on an outer diameter thereof configured to prevent axial movement of the clamping assembly relative to the housing tube. In certain embodiments, the clamping assembly can include one or more clamp lock features on an inner diameter thereof configured to prevent axial movement of the clamping assembly and/or the conductor relative to the housing.

In certain embodiments, the housing lock features and the one or more clamp lock features can be configured to mate with each other to axially lock the clamping assembly to the housing tube. In certain embodiments, the housing lock features can include one or more housing ribs extending outwardly from the outer diameter of the housing tube, and the one or more clamp lock features can include one or more clamp ribs extending inwardly from an inner diameter of the clamping assembly. In certain embodiments, the housing lock features can include a housing friction surface on the outer diameter of the housing tube, and the one or more clamp lock features can include a clamp friction surface and/or compression structure configured to interact with the housing friction surface.

The shoulder bushing can include a shoulder flange configured to seat the shoulder bushing to the housing tube and to contact the shielding termination. The shoulder bushing can be a non-conductive dielectric. The clamping assembly is conductive. The housing tube and/or shoulder bushing can be split into two or more pieces.

In certain embodiments, the assembly can include the conductor passing through the shoulder bushing. The shielding of the conductor can include the shielding termination. The shielding termination can separated from the conductor and terminates between the housing tube and the clamping assembly.

In accordance with at least one aspect of this disclosure, an aircraft electrical system can include a conductor having a shielding, the shielding comprising a shielding termination. The system can include a conductor shielding termination assembly, e.g., as disclosed herein, e.g., as described above.

In accordance with at least one aspect of this disclosure, a method can include terminating a shielding of a conductor in an aircraft system between a plurality of conductive components by clamping a conductive clamping assembly to an outer diameter of a conductive housing tube with the shielding therebetween. Terminating can include separating an insulated portion from the shielding by expanding an end of the shielding, placing the end of the shielding around the conductive housing tube, and clamping the conductive clamping assembly to the housing tube with shielding therebetween. Clamping can further include clamping a shielded portion of the conductor at a narrower portion of the clamping assembly.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
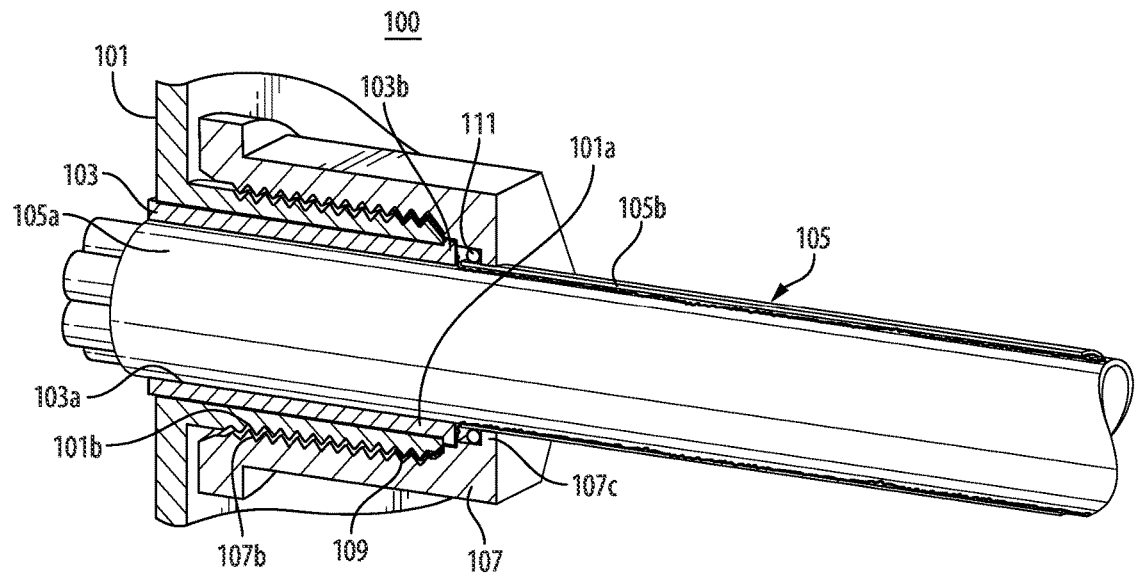
FIG. 1A is a cross-sectional schematic of an embodiment of an assembly in accordance with this disclosure.

Reference will now be made to the drawings wherein like reference numerals identify similar structural features or aspects of the subject disclosure. For purposes of explanation and illustration, and not limitation, an illustrative view of an embodiment of an assembly in accordance with the disclosure is shown in FIG. 1A and is designated generally by reference character 100. Other embodiments and/or aspects of this disclosure are shown in FIGS. 1B through 13. Certain embodiments described herein can be used to properly terminate conductor shielding, e.g., in a high voltage system.

Figure 1B:
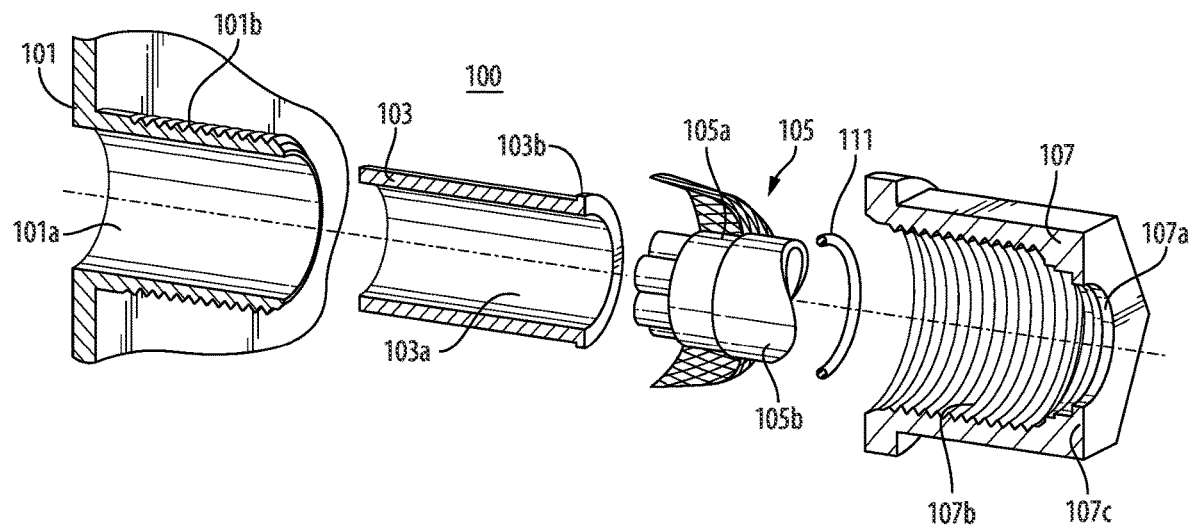
FIG. 1B is an exploded view of the embodiment of FIG. 1B.

Referring to FIGS. 1A and 1B, a conductor shielding termination assembly 100 can include a housing tube 101 defining an inner diameter housing channel 101a therethrough and having housing threads 101b on an outer diameter thereof. The housing tube 101 can be made of conductive material, for example (e.g., a metal).

The assembly 100 can include a shoulder bushing 103 configured to insert within the inner diameter housing channel 101a of the housing tube 101. The shoulder bushing 103 can define an inner diameter bushing channel 103a sized to receive an unshielded portion 105a of a conductor 105.

The assembly 100 can include a jam nut 107 comprising a nut inner diameter channel 107a sized to receive a shielded portion 105b of the conductor 105 and nut threads 107b on an inner diameter thereof configured to mesh with the housing threads 101b. The jam nut 107 and housing tube 101 can be configured to trap a shielding termination 109 within the meshed housing threads 101b and jam nut threads 107b, e.g., as shown in FIG. 1A.

The assembly 100 can include a gasket 111 (e.g., a flexible o-ring) configured to fit within the inner diameter of the jam nut 107 to compress the shielding termination 109 between the gasket 111 and the shoulder bushing 103 and/or housing tube 101 to provide flexible compression and/or stress relief.

The jam nut 107 can include an inner flange 107c configured to trap the gasket 111 between the inner flange 107c and the shielding termination 109.

The shoulder bushing 103 can include a shoulder flange 103b configured to seat the shoulder bushing 103 to the housing tube 101 and to contact the shielding termination 109. In certain embodiments, the shoulder bushing 103 can be a non-conductive dielectric material (e.g., silicone). The shoulder bushing flange 103b (and/or the entire shoulder bushing 103) can be flexible. For example, the shielding termination 109 can be sandwiched between the gasket 111 and the shoulder bushing flange 103b such that the shoulder bushing flange 103b provides flexibility and/or stress relief to the shielding termination 109. In this regard, the contact area where the shielding termination 109 is supported within the assembly 100 can be flexible on both sides and can prevent stress fracturing of the shielding material (e.g., woven wires) by providing cushion to move and/or vibrate.

Figure 2:
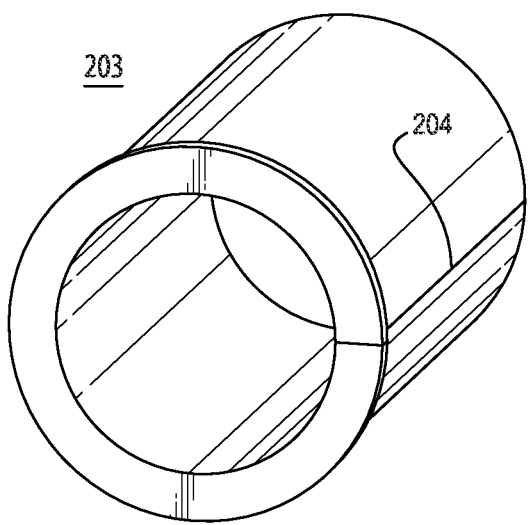
FIG. 2 shows a perspective view of an embodiment of a shoulder bushing in accordance with this disclosure, shown having a c-clip shape.

The shoulder bushing 103 can be a single continuous piece that forms a tube, and/or can be a c-clip type bushing 203 (e.g., with split line 204 as shown in FIG. 2). The shoulder bushing 103 can be comprised of any suitable number of separate pieces and/or have any suitable structural configuration.

Figure 3:
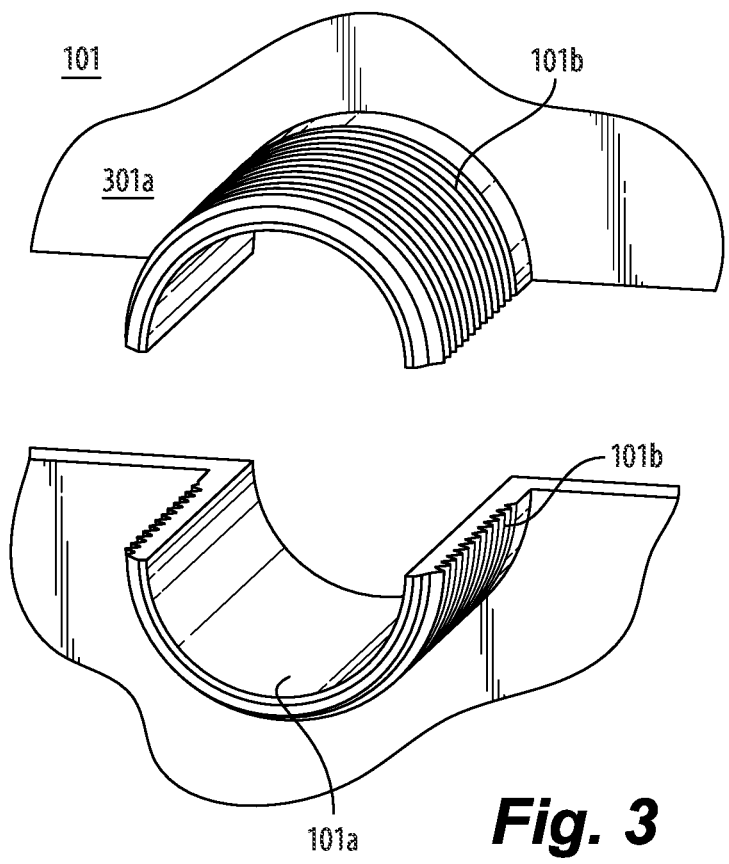
FIG. 3 shows an embodiment of a housing tube in accordance with this disclosure formed by two housing halves, showing the halves separated.

In certain embodiments, the housing threads 101b and the nut threads 107b can be square or smooth threads to prevent cutting of the shielding termination 109. Any suitable threads that mesh together are contemplated herein. Referring additionally to FIG. 3, in certain embodiments, the housing tube 103 and/or shoulder bushing 103 can be split into two or more pieces 301a, 301b.

In certain embodiments, the jam nut 107 can be conductive. In this regard, the housing tube 101 and the jam nut 107 can form the grounding circuit for the shielding 109, radially outward and separated from the unshielded portion 105a of the conductor 105.

Figure 4A:
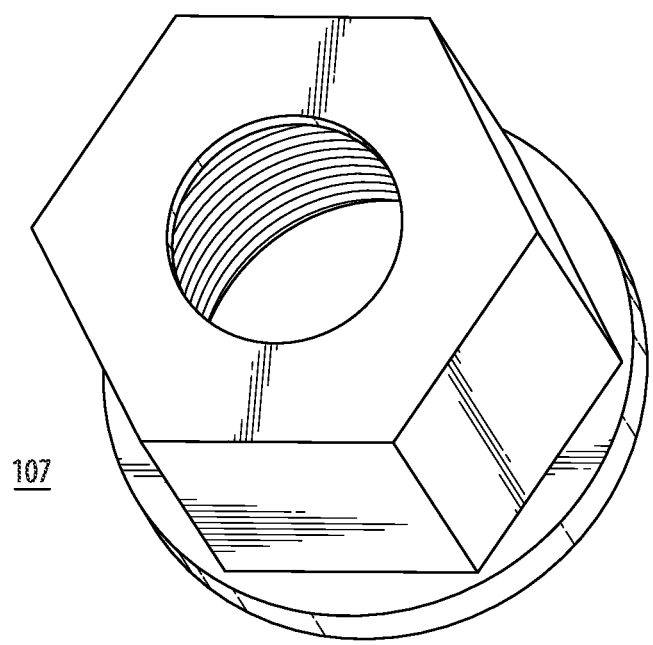
FIG. 4A shows a perspective view of an embodiment of a jam nut in accordance with this disclosure.
Figure 4B:
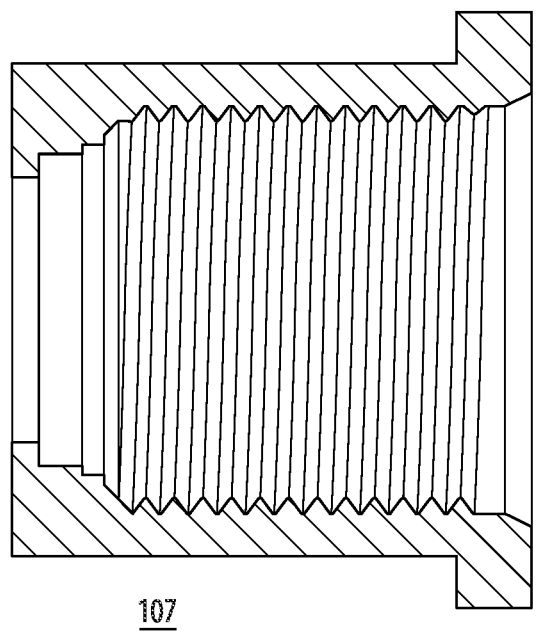
FIG. 4B shows a cross-sectional view of the embodiment of FIG. 4A.
Figure 5A:
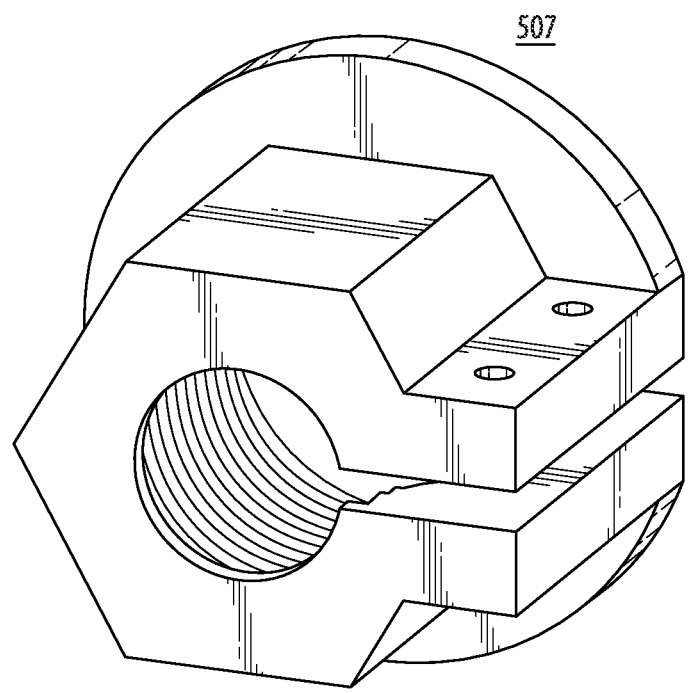
FIG. 5A shows another embodiment of a jam nut in accordance with this disclosure.
Figure 5B:
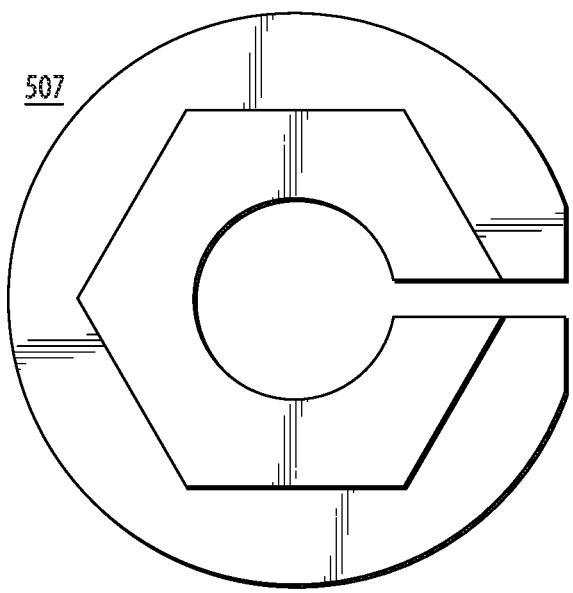
FIG. 5B shows an elevation view of the embodiment of FIG. 5A.
Figure 6:
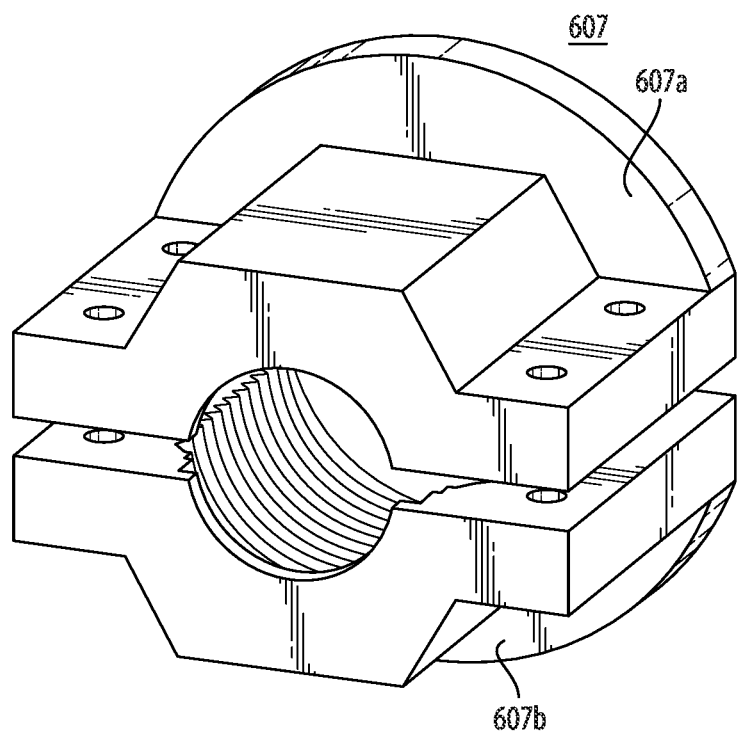
FIG. 6 shows a perspective view of an embodiment of a jam nut in accordance with this disclosure.

As shown in FIGS. 4A and 4B, the jam nut 107 can be a solid threaded screw-on nut. In certain embodiments, referring to FIGS. 5A and 5B, the jam nut 507 can be a C-clip configured to be fastened together (e.g., on one side as shown) to lock in place around the housing tube 101. In certain embodiments, the jam nut 107 can be two halves 607a, 607b configured to be fastened together around the housing tube 101. Any suitable configuration for the jam nut 607 is contemplated herein. Components having separable pieces may be more efficient to install on long conductors or already installed conductors that do not have a free end to allow a continuous piece to be slid over.

In certain embodiments, the assembly 100 can include the conductor 105 passing through the shoulder bushing 103. The shielding 109 of the conductor 105 can include the shielding termination 109, and the shielding termination 109 can be separated from the conductor 105 and terminate between the housing tube 101 and the jam nut 107. As shown, the shielding termination can be expanded outwardly in a cone shape to be trapped between the components.

In accordance with at least one aspect of this disclosure, an aircraft electrical system can include a conductor 105 having a shielding 109, the shielding comprising a shielding termination 109. The system can also include a conductor shielding termination assembly, e.g., assembly 100 as disclosed herein, e.g., as described above.

In accordance with at least one aspect of this disclosure, a method can include terminating a shielding of a conductor in an aircraft system between the threads of a plurality of conductive components. Terminating can include separating an insulated portion from the shielding by expanding an end of the shielding, placing the end of the shielding around a conductive housing tube having housing threads, and meshing one or more nut threads of a jam nut with the housing threads with the shielding therebetween. The method can include any other suitable method(s) and/or portion(s) thereof.

Embodiments can include threading the shield foil or braiding conductive shielding between metallic components outside the inner diameter of the assembly. This can keep electromagnetic emissions noisy ends of the braided shielding as far away from internal components as possible, and can also sandwich the shielding between two pieces of metal for better grounding. Embodiments can also provide stress/strain relief on the braided shielding using the flexible components, for example. Embodiments can also be arranged such that the assembly is waterproof/water resistant, and the assembly can also be repairable due to the removable nut, for example.

Embodiments can have a harness shield clamped for electrical termination between external thread of housing tube and jam nut. A gasket can be installed between the jam nut and the exposed shield and shield jacket. The jam nut can be one piece with a slit or two halves construction, for example, and can clamp the cable to provide cable support. A compliant dielectric shoulder bushing can be positioned around the harness insulation jacket and can provide support for the feeder harness going through housing tube.

The shoulder bushing edge can provide a stop for bushing in the installation and protection of the shield against housing tube edge. The shoulder bushing can be designed to have flange that extends over the housing tube so that this is where the bending portion of the shielding contacts the structure.

In embodiments, the harness shield can be exposed from the shield jacket and expanded forward. The harness shield can be routed over the housing tube conduit connection external thread and the jam nut can be used to clamp the shielding to the threads of housing. The harness can be routed with shoulder bushing into housing tube, and the gasket can provide jam nut corner to shield protection.

Embodiments can include an internally threaded jam nut with threads sized to account for shielding thickness. The harness can contact a compliant dielectric bushing (e.g., split or solid) placed around the insulation jacket harness and be placed in housing tube. The housing tube can be made of a split conductive housing.

In certain embodiments, one piece devices can be installed onto the feeder harness assembly before lug terminations. In certain embodiments, one piece devices can be installed onto the feeder harness assembly before lug terminations with split side for fasteners to clamp jam tight to housing threads. In certain embodiments, two piece (split) devices can be installed over feeder harness assembly after lug terminations or for certain repairable configuration with fasteners to clamp jam tight to housing threads.

Embodiments can provide electrical wire harness metal shielding termination on to a conductive cover housing with insulation around the bundle, with circumferential termination, with reworkable shield electrical bonding made by an internally threaded jam nut between shielding and the conductive housing externally threaded boss. The harness shielding can go over the outside of the conductive housing externally threaded boss.

In certain embodiments, a compliant dielectric shoulder bushing can be placed round the harness insulation harness up against the edge of the cable shielding, and is positioned inside the housing boss. In certain embodiments, a dielectric gasket can be put on the insulation jacket over the shield layer has that goes to the edge of the shielding. In certain embodiments, an internally threaded jam nut can be on the cable harness assembly shield insulation jacket from bonding the shield to the threaded housing boss. In certain embodiments, the shielding can be placed over the outside of the metallic externally threaded housing feed thru boss (part of the EMI housing) and a hex jam nut can be threaded over the shield braid (or foil) on to the housing external threads and tightened to clamp the shield material between external threads and internal threads.

Embodiments can provide shield termination to a conductive housing with strain relief insulation around the feeder, with circumference shield termination, and with reworkable shield bonding to the housing made by a threaded jam nut. The shielding can go over the outside of the conductive externally threaded boss. The insulated jacket of harness can have a dielectric bushing placed round the feeder and is positioned inside the housing boss. The shield insulation jacket can have a compliant dielectric gasket that goes to the edge of the shielding. The shielding can be placed over the outside of the externally threaded boss and the hex jam nut can be threaded over the shield braid on to the housing external threads and tightened to clamp the shield material between the threads.

Embodiments can provide 360 degrees (circumference) connection of shield material to conductive housing for complete enclosure of harness within the shield and continuing into a metallic conductive housing assembly. Embodiments can allow a shield to be ground connected to the housing at a distance away from the feeder electrical power connection for high voltage spacing robustness.

The conductive housing with the externally threaded boss which can be a feed thru tube part of the housing with the harness cable installed into the boss, or split at the center of the tube for half to be on a cover and half on the base, with the harness cable laid into the bottom half and terminated before the shield is terminated on to the housing. Such embodiments can allow the shielded feeder to be prepared with shielded material exposed, insulation adjusted and positioned from the electrical termination and be installed at the assembly point.

The shield connection or bonding connector to metal housing can be threaded jam nut to provide large grounding area for shield to housing, which is easily handled for installation and removal. The threaded jam nut can be a jam nut (which are installed on feeder before lugs are installed) or split (or two (2) piece) assembly (which can be installed after lugs are installed on feeder) which allows for repair. Embodiments can include a complaint shoulder bushing and gasket around the insulation protects the feeder insulation jackets from the housing feed through and the threaded jam nut for strain relief support and contamination (pollution) protection.

Shielding of power feeders for EMC/EMI protection allow reduced weight of system component filtering and will become the more common with system applications like electrical propulsion on aircraft.

Embodiments can provide circumference connection of shield to conductive housing for complete shielding of conductors within the housing assembly. The conductive housing with the externally threaded boss can have the harness laid into the threaded boss and is electrically terminated inside the housing. The shielded harness can be prepared and positioned from the electrical termination and be installed at the assembly point. The dielectric bushing and gasket around the insulation jacket can protect the insulation. Any other suitable benefits are contemplated herein.

Figure 7A:
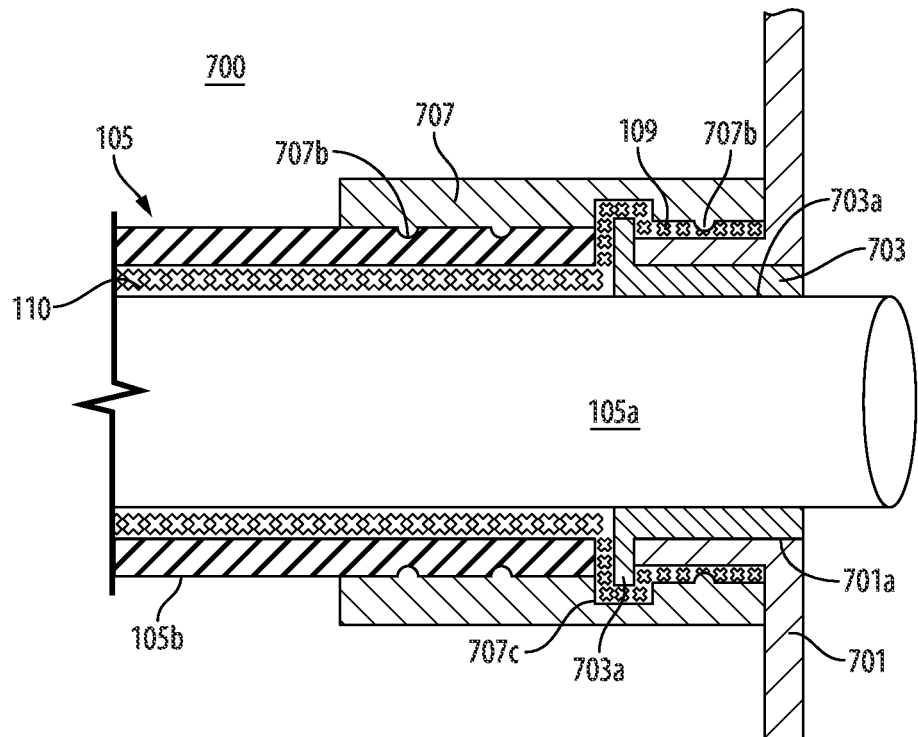
FIG. 7A shows a cross-sectional schematic view of an embodiment of an assembly in accordance with this disclosure.
Figure 7B:
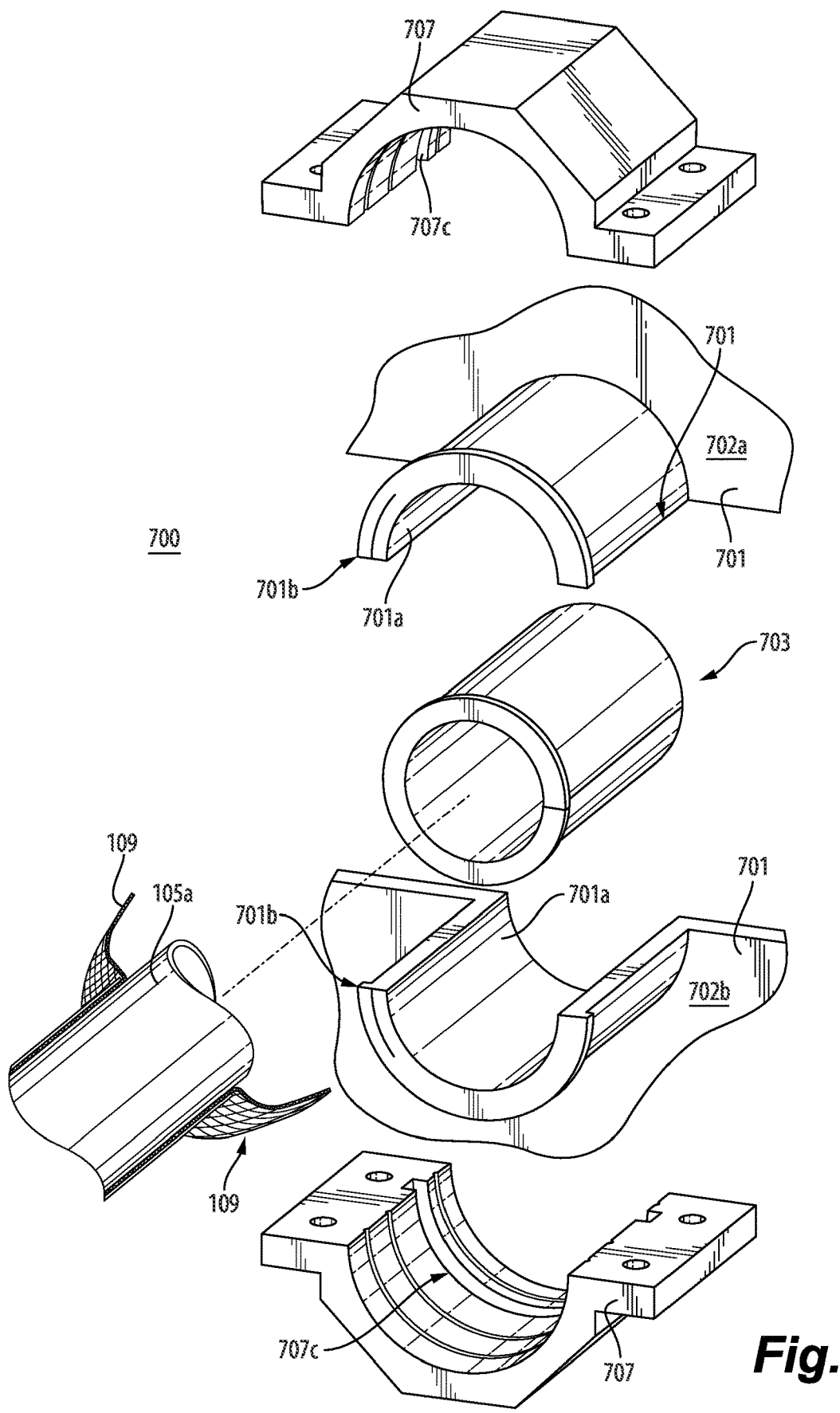
FIG. 7B shows an exploded view of the embodiment of FIG. 7A.

In accordance with at least one aspect of this disclosure, referring to FIGS. 7A and 7B, and additionally FIGS. 8 through 13, another embodiment of a conductor shielding termination assembly 700 is shown. The assembly 700 can be similar to the embodiments of an assembly as disclosed above, for example, except have a clamping assembly 707 instead of a threaded member that screws on. As shown, embodiments can include a housing tube 701 defining an inner diameter housing channel 701a therethrough. The housing tube 701 can be made of conductive material, for example (e.g., a metal or conductive plated plastic).

The assembly 700 can include a shoulder bushing 703 configured to insert within the inner diameter housing channel 701a of the housing tube 701. The shoulder bushing 703 can define an inner diameter bushing channel 703a sized to receive an unshielded portion 105a (an insulator layer and the conductive element(s)) of a conductor 105.

The assembly 700 can include a clamping assembly 707 configured to clamp around the housing tube 701 and/or the conductor 105 to axially lock the housing tube 701 and the conductor 105 and to trap a shielding termination 109 of a shielding 110 between the housing tube 701 and the clamping assembly 707. The clamping assembly 707 can form a clamping inner diameter channel sized to receive a shielded portion 105b of the conductor 105 (e.g., an outer insulator layer, the shielding layer, an inner insulating layer, and the conductive element(s) therewithin).

Figure 11:
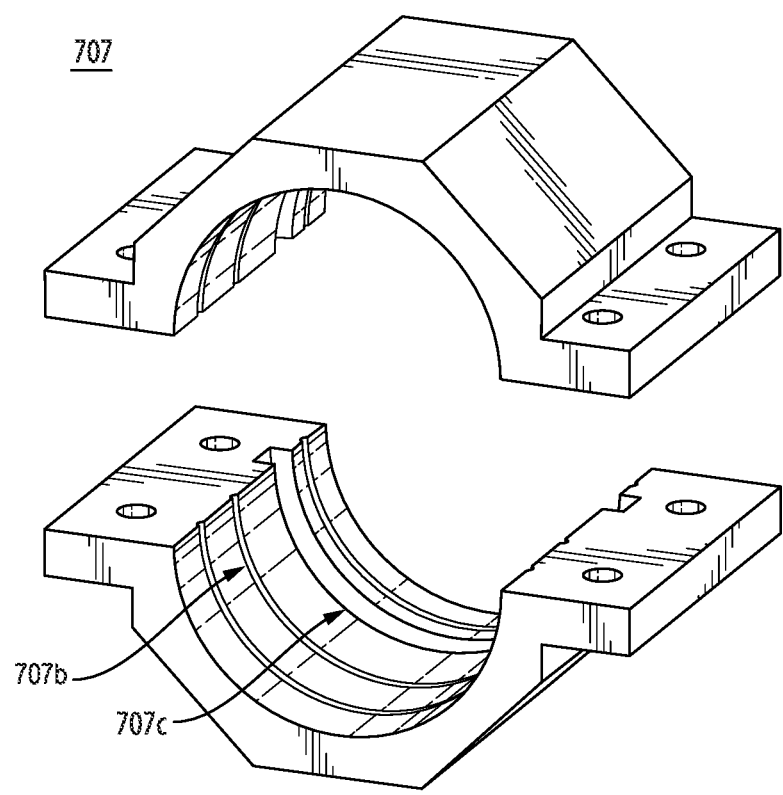
FIG. 11 shows an embodiment of a clamping assembly as shown in FIG. 7A, shown with halves separated.
Figure 12:
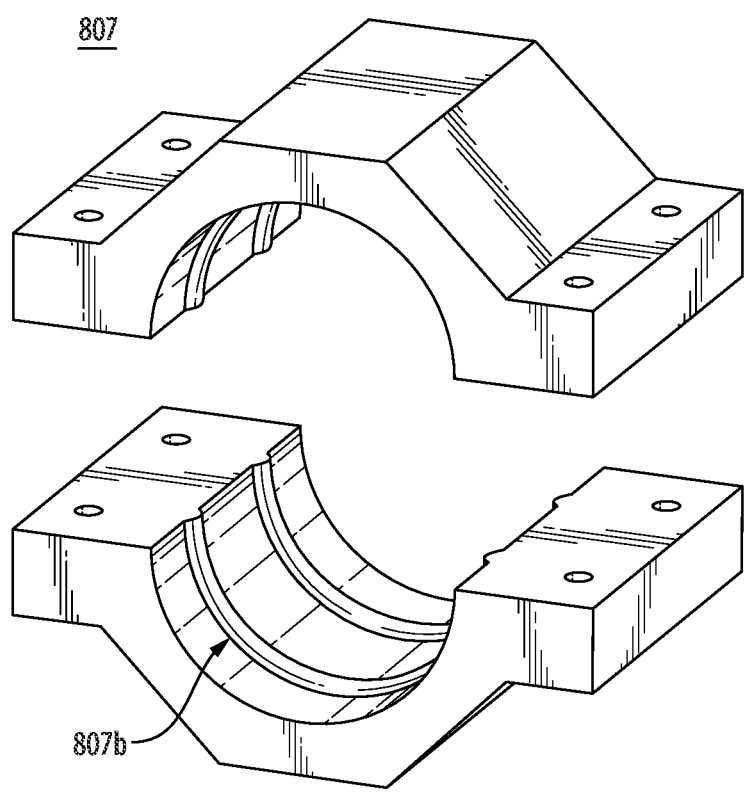
FIG. 12 shows an embodiment of a clamping assembly in accordance with this disclosure, shown with halves separated.
Figure 13:
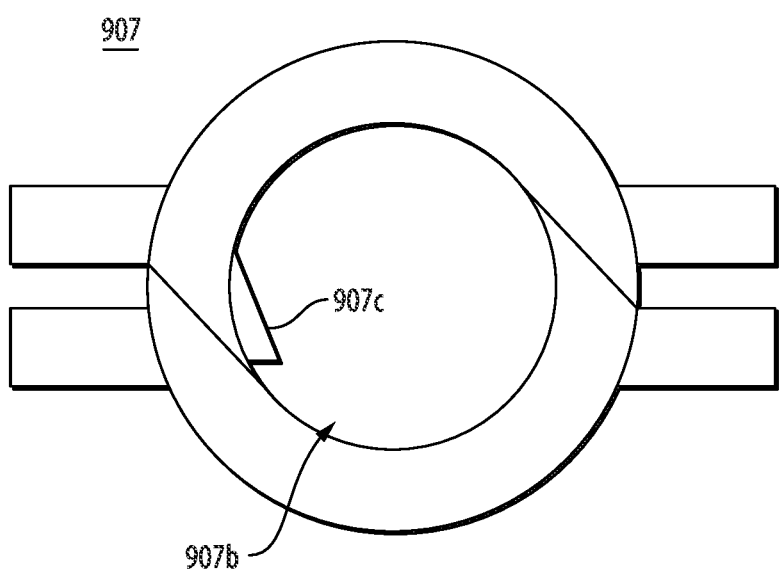
FIG. 13 shows an embodiment of a clamping assembly in accordance with this disclosure, shown with halves separated.

In certain embodiments, the clamping assembly 707 can include two or more clamp pieces (e.g., two halves, e.g., as shown in FIGS. 11-13) configured to assemble around and to compress against the shielded portion 105b of the conductor 105. Any suitable number of pieces is contemplated herein.

Figure 8:
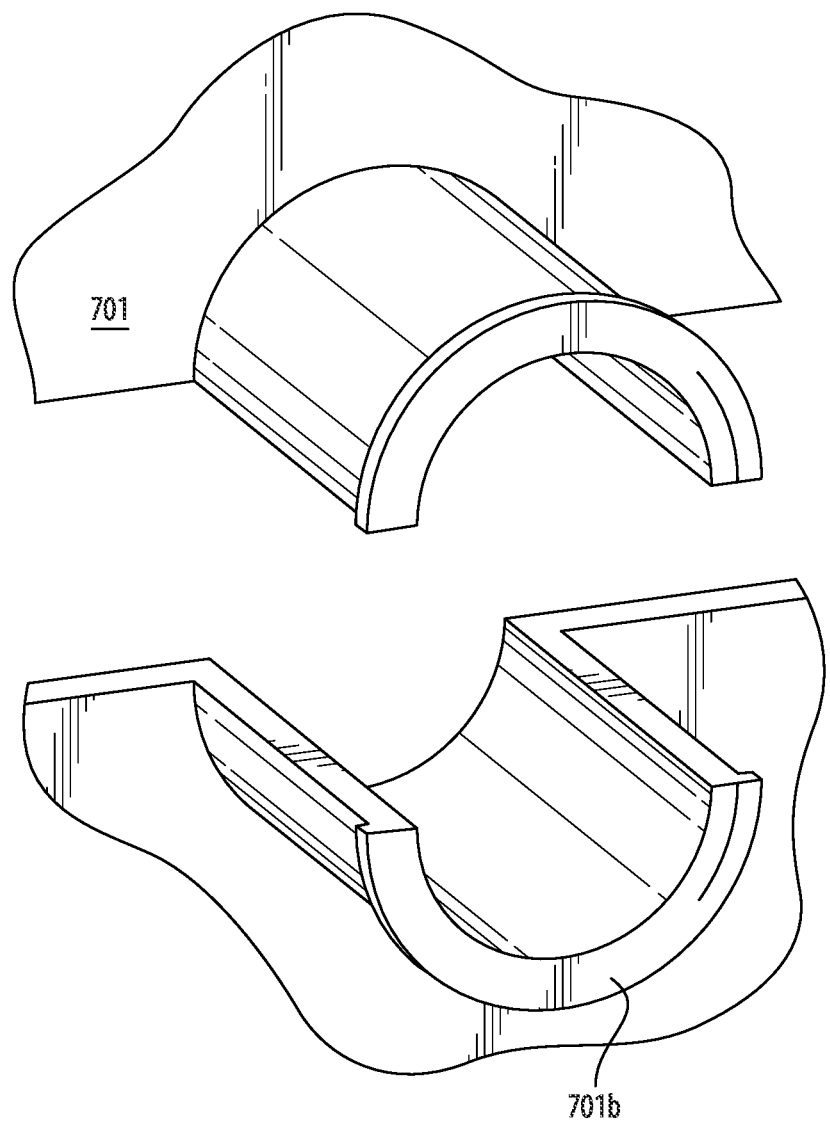
FIG. 8 shows an embodiment of a housing tube as shown in FIG. 7A, showing the halves separated.

The housing tube 701 can include one or more housing lock features 701b, on an outer diameter thereof configured to prevent axial movement of the clamping assembly 707 relative to the housing tube 701. For example, the one or more housing lock features can include a flanged end at the end of the housing tube 701 as shown in FIGS. 7B and 8. In certain embodiments, the clamping assembly 707 can include one or more clamp lock features 707b, 707c (e.g., channels and/or ribs) on an inner diameter thereof configured to prevent axial movement of the clamping assembly 707 and/or the conductor 105 relative to the housing tube 701.

In certain embodiments, as shown in FIG. 7B, the housing lock features 701b and the one or more clamp lock features 707c can be configured to mate with each other to axially lock the clamping assembly 707 to the housing tube 707. For example, referring to FIGS. 8 and 11, the housing lock features 701b can include a radial protrusion such as the flanged end 701b and the clamp lock feature 707c can be a well 707c configured to receive flanged end 701b.

Figure 9:
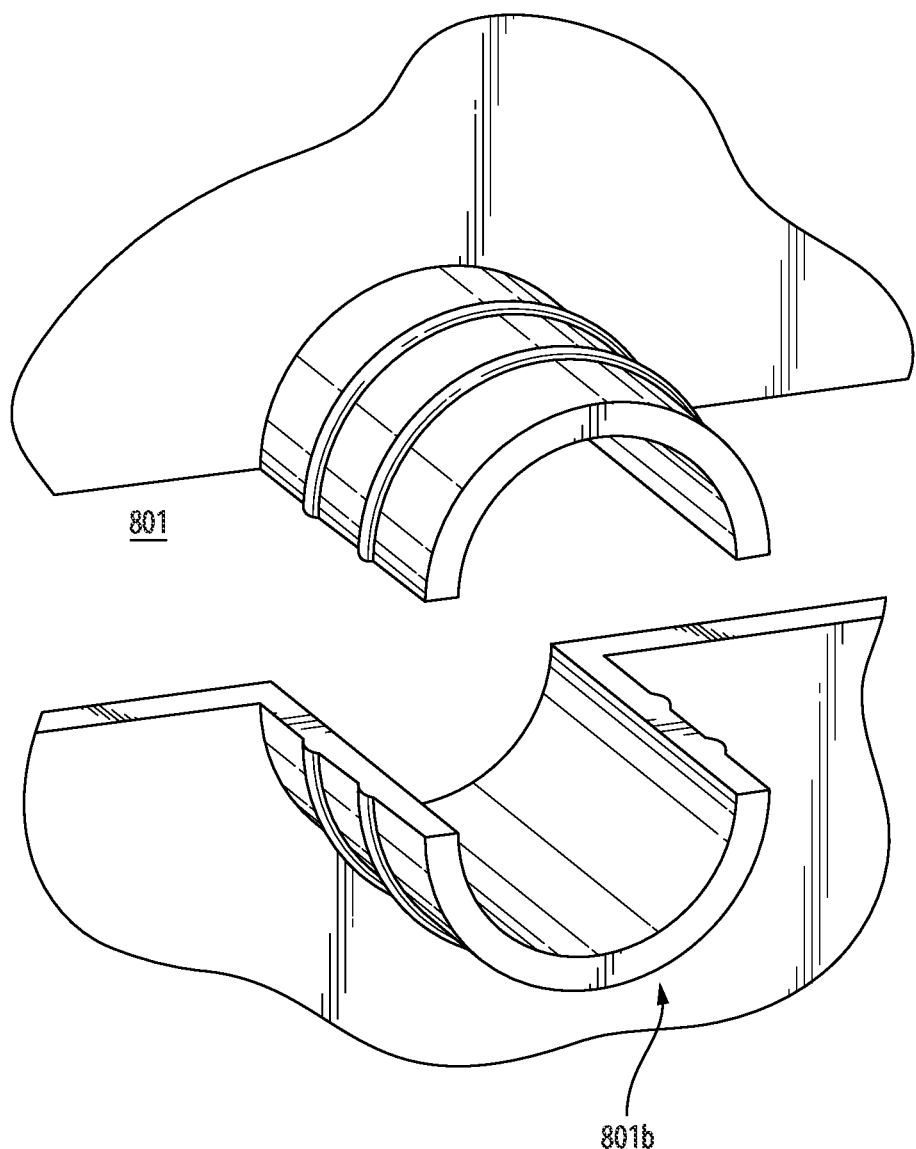
FIG. 9 shows an embodiment of a housing tube in accordance with this disclosure, showing the halves separated.
Figure 10:
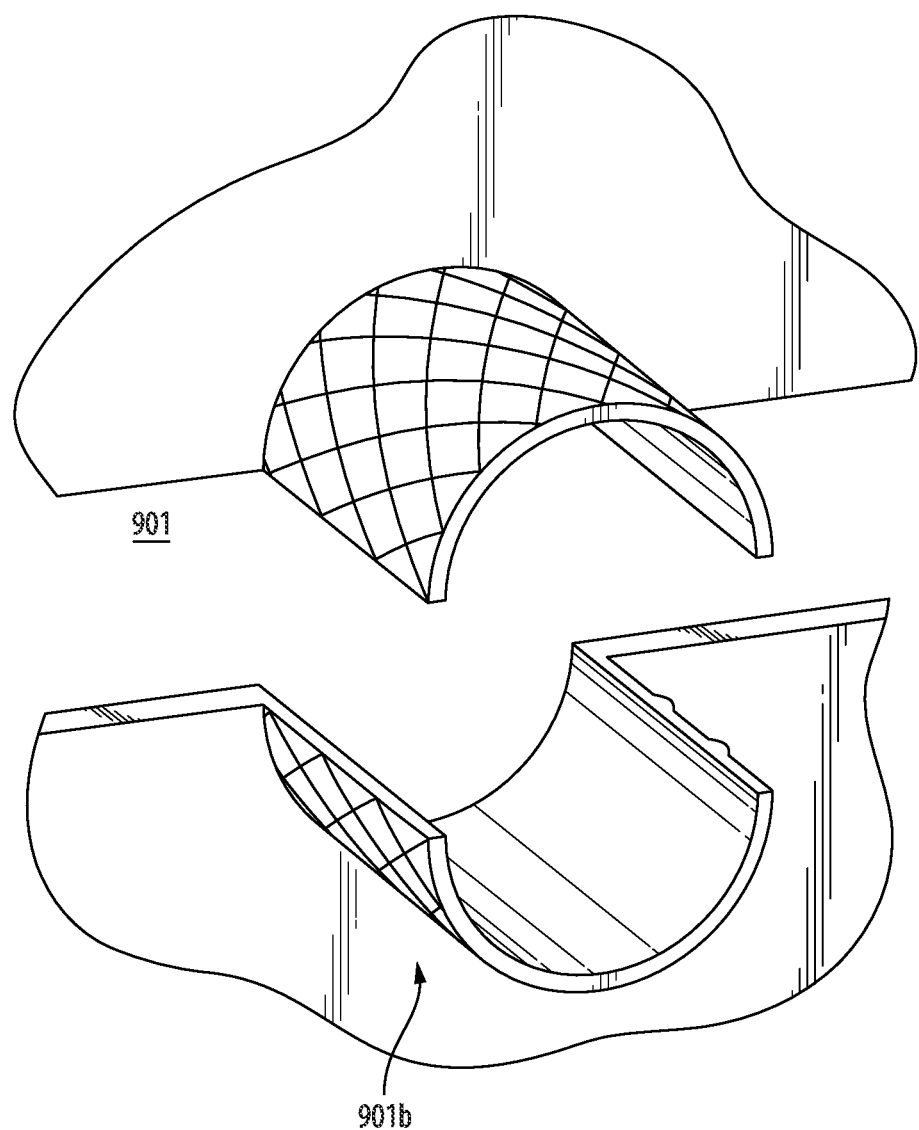
FIG. 10 shows an embodiment of a housing tube in accordance with this disclosure, showing the halves separated.

In certain embodiments, referring to FIGS. 9 and 12, the housing lock features 801b can include one or more housing ribs 801b extending outwardly from the outer diameter of the housing tube 801, and the one or more clamp lock features 807b can include one or more clamp ribs 807b extending inwardly from an inner diameter of the clamping assembly 807. In certain embodiments, referring to FIGS. 10 and 13, the housing lock features 901 can include a housing friction surface 901b on the outer diameter of the housing tube 901, and the one or more clamp lock features 907b can include a clamp friction surface 907b and/or compression structure 907c configured to interact with the housing friction surface 901b.

In certain embodiments, the shoulder bushing 703 can include a shoulder flange 703a configured to seat the shoulder bushing 703 to the housing tube 701 and to contact the shielding termination 109. The shoulder bushing 703 can be a non-conductive dielectric material, for example, and can be flexible to provide cushion to the shielding termination 109 (e.g., as described above). The clamping assembly 707 can be conductive, for example. As shown, the housing tube 701 and/or shoulder bushing 703 can be split into two (e.g., halves 702a, 702b as shown in FIG. 7B) or more pieces (e.g., and fastened together by the clamping assembly 707 when installed). Embodiments of housing tube assemblies do not have to be separate halves, and can be single piece.

In certain embodiments, the assembly 700 can include the conductor 105 passing through the shoulder bushing 703. The shielding 110 of the conductor 105 can include the shielding termination 109. The shielding termination 109 can separated from the conductor 105 and terminates between the housing tube 701 and the clamping assembly 707.

In accordance with at least one aspect of this disclosure, an aircraft electrical system can include a conductor 105 having a shielding 110, the shielding comprising a shielding termination 109. The system can include a conductor shielding termination assembly, e.g., as disclosed herein, e.g., assembly 700 as described above.

In accordance with at least one aspect of this disclosure, a method can include terminating a shielding of a conductor in an aircraft system between a plurality of conductive components by clamping a conductive clamping assembly to an outer diameter of a conductive housing tube with the shielding therebetween. Terminating can include separating an insulated portion from the shielding by expanding an end of the shielding, placing the end of the shielding around the conductive housing tube, and clamping the conductive clamping assembly to the housing tube with shielding therebetween. Clamping can further include clamping a shielded portion of the conductor at a narrower portion of the clamping assembly.

Embodiments can utilize a clamp to secure the shielding, and certain embodiments can have ribs or other features. Certain embodiments can have an extra bushing to avoid ribs from pressing into the shielding. Certain embodiments utilizing clamping may not require a gasket as disclosed above with respect to the assembly 100 because the stress may not be an issue since the forces on the shielding can be controlled to be mostly or all radial force and no axial force.

In embodiments, a harness shield can be clamped for electrical termination between outer and housing boss (tube) and a clamp. Clamped halves (either pin hinged or a two half assembly, for example) can additionally provide cable support. In certain clamped embodiments, everything can be placed around the conductor and then clamped down.

Embodiments can include a two (2) piece (split) shield electrical connection clamping component with an elongated flange thickness for feeder cable support. Embodiments of a conductor can include a shield insulation jacket, harness shielding, and a conductor with an insulation jacket. The clamp can clamp onto or into the shield insulation jacket at certain locations to provide conductor support.

Embodiments can include a housing and feed through boss tube that can be split into two (2) halves, e.g., if the feeder harness is not a bulk head pass thru the conductive chassis enclosure opening. In certain embodiments, the tube can have a flanged end, and/or the tube can have external ribs, and/or the tube surface can be textured, knurled, or cross hatched. Embodiments of a clamp can have complimentary features and/or can have wedges to provide some axial force, for example.

Embodiments of a clamping assembly can be positioned at installation to allow easy access to tightening fasteners. In certain embodiments, the clamping assembly can have one side as a pinned hinge and the second side the flange with fasteners for tightening to make the ground connection.

In embodiments, the harness shield can be expanded and routed over the housing tube conduit with external texture or ribs. The harness can have a compliant dielectric bushing (split or solid) placed around the conductor insulation jacket. A housing feed through tube can be electrically conductive for shield and mechanical supporting of insulator bushing.

Embodiments can provide shield termination on to a conductive cover housing with strain relief insulation around the feeder, with circumference termination, with reworkable shield electrical bonding to the housing made by a clamping flange assembly. The shielding can go over the outside of the conductive housing externally textured boss. The insulated jacket of harness can have a compliant dielectric bushing placed round the feeder and can be positioned inside the housing boss. The insulation jacket over the shield layer can have a compliant dielectric gasket that goes to the edge of the shielding. The shielding can be placed over the outside of the externally textured boss and the clamping flange can be placed over the shield braid and the housing external boss and clamp fasteners can be tightened to connect the shield to the housing boss.

Embodiments can provide circumference connection of shield material to conductive housing for complete enclosure of harness within the shield and into the conductive housing assembly. The conductive housing with the externally textured boss can have the harness cable installed into the boss and harness can be electrically terminated before the shield is terminated on to the housing. Embodiments can allow the shielded harness to be prepared and insulation adjusted and positioned from the electrical termination and be installed at the assembly point. The shield bonding connection to conductive housing can be clamping to provide large clamping area. The clamping assembly can be a 2-piece split to be installed after feeder lugs are installed and positioned to allow tightening of clamping fasteners. The complaint shoulder bushing and gasket around the insulation jacket can protect the feeder insulation jackets from the housing feed through.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A conductor shielding termination assembly, comprising:
    a housing tube defining an inner diameter housing channel therethrough, wherein the housing tube is made of conductive material;
    a shoulder bushing configured to insert within the inner diameter housing channel of the housing tube, the shoulder bushing defining an inner diameter bushing channel sized to receive an unshielded portion of a conductor; and
    a clamping assembly including two or more clamp pieces configured to clamp around at least one of the housing tube or the conductor to axially lock the housing tube and the conductor and to trap a shielding termination between the housing tube and the clamping assembly, wherein the clamping assembly forms a clamping inner diameter channel sized to receive a shielded portion of the conductor.

2. The assembly of claim 1, wherein the two or more clamp pieces are further configured to assemble around and to compress against the shielded portion of the conductor.

3. The assembly of claim 2, wherein the housing tube includes one or more housing lock features on an outer diameter thereof configured to prevent axial movement of the clamping assembly relative to the housing tube.

4. The assembly of claim 3, wherein the clamping assembly includes one or more clamp lock features on an inner diameter thereof configured to prevent axial movement of at least one of the clamping assembly or the conductor relative to the housing tube.

5. The assembly of claim 4, wherein the one or more housing lock features and the one or more clamp lock features are configured to mate with each other to axially lock the clamping assembly to the housing tube.

6. The assembly of claim 4, wherein the one or more housing lock features include one or more housing ribs extending outwardly from the outer diameter of the housing tube, and the one or more clamp lock features include one or more clamp ribs extending inwardly from the inner diameter of the clamping assembly.

7. The assembly of claim 4, wherein the one or more housing lock features include a housing friction surface on the outer diameter of the housing tube, and the one or more clamp lock features include at least one of a clamp friction surface or a compression structure configured to interact with the housing friction surface.

8. The assembly of claim 1, wherein the shoulder bushing includes a shoulder flange configured to seat the shoulder bushing to the housing tube and to contact the shielding termination.

9. The assembly of claim 8, wherein the shoulder bushing is a non-conductive dielectric.

10. The assembly of claim 9, wherein the clamping assembly is conductive.

11. The assembly of claim 1, wherein at least one of the housing tube or the shoulder bushing is split into two or more pieces.

12. The assembly of claim 1, further comprising the conductor passing through the shoulder bushing, wherein a shielding of the conductor includes the shielding termination, wherein the shielding termination is separated from the conductor and terminates between the housing tube and the clamping assembly.

13. An aircraft electrical system, comprising:
a conductor having a shielding, the shielding comprising a shielding termination; and
a conductor shielding termination assembly comprising:
a housing tube defining an inner diameter housing channel therethrough, wherein the housing tube is made of conductive material;
a shoulder bushing configured to insert within the inner diameter housing channel of the housing tube, the shoulder bushing defining an inner diameter bushing channel sized to receive an unshielded portion of the conductor; and
a clamping assembly including two or more clamp pieces configured to clamp around at least one of the housing tube or the conductor to axially lock the housing tube and the conductor and to trap the shielding termination between the housing tube and the clamping assembly, wherein the clamping assembly forms a clamping inner diameter channel sized to receive a shielded portion of the conductor.

14. The system of claim 13, wherein the two or more clamp pieces are further configured to assemble around and to compress against the shielded portion of the conductor.

15. The system of claim 14, wherein the housing tube includes one or more housing lock features on an outer diameter thereof configured to prevent axial movement of the clamping assembly relative to the housing tube.

16. The system of claim 15, wherein the clamping assembly includes one or more clamp lock features on an inner diameter thereof configured to prevent axial movement of at least one of the clamping assembly or the conductor relative to the housing tube.

17. The system of claim 16, wherein the one or more housing lock features and the one or more clamp lock features are configured to mate with each other to axially lock the clamping assembly to the housing tube.

18. The system of claim 16, wherein the one or more housing lock features include one or more housing ribs extending outwardly from the outer diameter of the housing tube, and the one or more clamp lock features include one or more clamp ribs extending inwardly from the inner diameter of the clamping assembly.

19. A method, comprising:
terminating a shielding of a conductor in an aircraft system between a plurality of conductive components by clamping a conductive clamping assembly including two or more clamp pieces to an outer diameter of a conductive housing tube with the shielding therebetween.

20. The method of claim 19, wherein terminating includes separating an insulated portion from the shielding by expanding an end of the shielding, placing the end of the shielding around the conductive housing tube, and clamping the conductive clamping assembly to the housing tube with the shielding therebetween, wherein clamping further comprises clamping a shielded portion of the conductor at a narrower portion of the clamping assembly.

* * * * *